United States Patent [19]

Faber et al.

[11] Patent Number: 4,747,624
[45] Date of Patent: May 31, 1988

[54] CONNECTION ARRANGEMENT FOR TWO PIPES CARRYING HOT FLUIDS, FOR EXAMPLE INTERNAL COMBUSTION ENGINE EXHAUST GASES

[75] Inventors: Bernd Faber, Pforzheim; Reinhard Gropp, Neuenbürg-Arnbach, both of Fed. Rep. of Germany

[73] Assignee: Witzenmann GmbH Metallschlauch-Fabrik Pforzheim, Pforzheim, Fed. Rep. of Germany

[21] Appl. No.: 930,280

[22] Filed: Nov. 12, 1986

[30] Foreign Application Priority Data

Jul. 25, 1986 [EP] European Pat. Off. ...... 866110255-6

[51] Int. Cl.[4] ............................................. F16L 55/00
[52] U.S. Cl. ..................... 285/187; 285/231; 285/906; 285/917; 277/205; 277/230; 277/234; 277/DIG. 6
[58] Field of Search ............... 285/223, 231, 906, 917, 285/913, 910, 233, 234, 187, 351; 277/DIG. 6, 230, 234, 205

[56] References Cited

U.S. PATENT DOCUMENTS

| | | | |
|---|---|---|---|
| 2,724,602 | 11/1955 | Carey et al. | 285/234 X |
| 2,841,419 | 7/1958 | Jay | 285/351 X |
| 4,516,782 | 5/1985 | Usher | 285/910 X |
| 4,565,380 | 1/1986 | Newman et al. | 277/205 |

FOREIGN PATENT DOCUMENTS

| | | | |
|---|---|---|---|
| 0103676 | 3/1984 | European Pat. Off. | |
| 2701022 | 7/1978 | Fed. Rep. of Germany | 285/223 |
| 3002446 | 7/1981 | Fed. Rep. of Germany | |
| 3241750 | 5/1984 | Fed. Rep. of Germany | |
| 14216 | 2/1977 | Japan | 285/187 |
| 635662 | 4/1983 | Switzerland | |

Primary Examiner—Dave W. Arola
Attorney, Agent, or Firm—Frishauf, Holtz, Goodman & Woodward

[57] ABSTRACT

To connect two pipes which may carry high-temperature potentially corrosive fluids, for example exhaust gases from an internal combustion engine, while permitting flexing of the pipes with respect to each other in torsion or twist, bending or lateral shift, while maintaining a sealed connection, a ring chamber is formed in the region of the pipe ends, by an overlapping pipe end portion of the like, an external sleeve; or overlapping flange construction, which retains therein a sealing and support pillow of ceramic or metal materials in form of fibers, filaments or the like, felted, matted, woven, knitted and compressed together; a metal sealing foil, for example of aluminum or specialty steel, crinkled or creased and preferably formed with expansion/contraction undulations, is located within the pillow. More than one pillow may be used, and the pillows may be located against one pipe, overlapped by the end portion of another, with a heat insulation therebetween, or spanning a gap of two butt-aligned pipes, axially retained in position by flanges on the pipe ends and/or rim portions of a surrounding sleeve or clamp.

19 Claims, 3 Drawing Sheets

CONNECTION ARRANGEMENT FOR TWO PIPES CARRYING HOT FLUIDS, FOR EXAMPLE INTERNAL COMBUSTION ENGINE EXHAUST GASES

The present invention relates to a connection arrangement for pipes carrying hot fluids, and more particularly to connect exhaust pipes or conduits which carry exhaust gases from internal combustion engines. Such exhaust conduits or exhaust pipes must provide tight connections while permitting flexibility in three dimensions to accomodate changes in axial, lateral and angular direction and alignment of the respective pipes or conduits to be connected.

BACKGROUND

Various types of connections for two pipes which permit a degree of flexibility of the connection are known. Such flexibility is required, for example, when exhaust gases are carried by the pipes. The connections, of course, must be tight to prevent the escape of any of the fluids, typically exhaust gases, within the pipes. The pipes will change dimension upon carrying hot exhaust gases and, for example, upon reverting again to ambient temperature. Additionally, the pipes may be subjected to external twisting, that is torsional, lateral, and other forces which may be caused by differential expansion and contraction of components under heating and cooling conditions, or under conditions of vibration or other stresses being applied.

A known pipe connection which permits some change in dimensional orientation of two pipes can be formed by a bellow, The bellows may have connecting elements located outside of the bellows, which have the tendency to hold the ends of the pipes in a predetermined centered position with respect to each other, the bellows, however, permitting limited change. The arrangement is expensive and space-consuming. The bellows itself is used for sealing and to permit a degree of flexibility. Torsional forces, however, cannot usually be accepted by the bellows, since a bellows is not suitable to accept torsion or twisting forces; if such forces are applied to the bellows, it will have the tendency to tear and thus the sealing integrity thereof is impaired. Bellows are expensive, and to permit a reasonable degree of longitudinal change, require a substantially long axial dimension. Only if the bellows are comparatively is it possible to consider a reasonable lifetime for such a connection without damage to the sealing capability of the bellows.

The bellows, when used, are usually connected to the pipes by flanges. The flanges additionally increase the cost of such a connection, and are space-consuming. The size of such connection elements also determines the length of the bellows which is used.

Other connecting arrangements for pipes have been proposed, each having specific disadvantages, based on the individual construction. For example, it is possible to connect two ends of pipes simply by using a corrugated pipe structure. To accomodate a reasonable degree of change, it is necessary to utilize a corrugated element of comparatively long dimension. In those installations in which it is necessary that the connection is stiff with respect to bending forces, for example if the connection is to be self-supporting without additional hangers, torsional forces or torsional or twisting movement cannot be accepted. The damping characteristic of such connections is poor and the spring characteristic of the corrugated element itself is linear.

It has been proposed to couple two ends of pipes by providing a ball-and-socket arrangement of spherical shape, similar to a ball joint, and clamping the ends of the pipes together by compression springs. The axial construction of such an arrangement is comparatively small. The construction, however, does not permit axial movement or lateral shifting of the ends of the pipes with respect to each other. The compression springs compressing the elements of the ball-and-socket joint together required substantial space in radial direction. The construction has another disadvantage which is economic—the manufacture of spherical contours is expensive and additionally is subject to excessive wear. Additionally, the connection, in use, is apt to be noisy.

THE INVENTION

It is an object to provide a connection which is axially short, radially constricted, preferably within the dimensions within, or only slightly in excess of dimensions defined by the pipes, and which does not require separate elements which effect sealing on the one hand and mechanical support on the other, but which, in contrast, combines as many functions as possible in single components. Preferably, also, the construction should be such that it is capable of accepting torsional forces and movement, which can be easily assembled and, further, is inexpensive in comparison with prior art structures.

Briefly, a ring chamber is formed by a pipe end or pipe end element welded thereto, for example, to define the chamber or space surrounding the end portion of the pipes. At least one sealing pillow is located in the ring chamber or space. The material of the pillow has damped springy or resilient characteristics; the pillow is retained in the chamber or space in a predetermined axial and radial position, for example by positioning or snap rings or ridges or the like. The facing ends of the pipes are radially supported and located in position at least in approximate alignment with respect to each other by the pillow itself which is retained in the chamber or space. A sealing foil is embedded in the pillow, extending over the entire radial range of the ring chamber.

The construction results in an externally smooth, axially short and radially small connection. The sealing pillow has two functions which are combined in one constructional component, namely sealing and, further, damped-resilient support. The pillow permits, by some deformation, flexible acceptance of axial forces, lateral forces, and angular or torsional forces, resulting in respectively axial, lateral or torsional or twisting movements. This flexible acceptance of these forces is permitted by the shape of the sealing pillow fitting within the chamber or space. The arrangement has the specific advantage with respect to prior art constructions that torsional or twisting forces, resulting in torsion or twisting or angular movement, can be accepted in the same manner as axial, longitudinal shifting or lateral bending movements.

The construction in accordance with the present invention integrates the sealing effect as well as transfer of forces which are, therefore, combined in a single element. The sealing pillow may have different deformation characteristics, which can be non-linear and, for example progressively more resistant to forces. The deformation characteristics, and opposing forces generated in the sealing pillow towards deformation can be controlled readily by suitable construction thereof, which, additionally, permits formation of the sealing pillow to provide more or less damping or counter-force with respect to vibration or forces being applied to the seal; further, noise transfer can be inhibited and controlled by suitable construction of the pillow.

The system in accordance with the invention can be used to provide a connection which is stiff with respect to bending of axially aligned pipe or tube ends; the degree of stiffness can be suitably selected by appropriate selection or design of the sealing pillow or, if more than one is used, of sealing pillows.

The sealing pillow can be made of various materials which, in accordance with the fluids to be handled by the pipes, will have respectively different temperature and/or corrosion-resistant characteristics. For example, the sealing pillow can be made of temperature and/or corrosion-resistant ceramics or metallic material in the form of a fiber or wire mesh, felt, fabric, or compressed material. The fabric may be woven or knitted. To reduce wear, particularly wear of the fibers or wires, or fibrous elements or filaments within the material of the pillow itself, the respective elements can be coated or formed with slippery materials, for example Teflon (trademark). Additionally, the pillow can have slippery or low-friction material and additional sealing materials mixed therein, for example distributed and compressed therein to form, overall, a compound pillow element.

In accordance with a particularly desirable construction—especially for certain applications requiring high strength and/or hardness—the pillow may have a support body included therein which has a greater hardness or strength than the remainder of the pillow material. Such support bodies can be used, especially, to control the progressive deformation characteristics of the pillow, since, by volume, they decrease the quantity of the deflectable pillow material and, after the deflectable or compressible pillow material has been compressed, the support effect of such support elements which may be essentially non-compressible becomes enhanced.

The sealing foil may be a creased or wrinkled metal foil. A suitable metal is high-strength or special steel, stainless steel, aluminum or aluminum alloys, or the like. These materials are particularly desirable, although others can be used. It is also possible to surround the pillow by a sealing foil, for example by a roving or in form of a bandage or wrapping. In such constructions, it is preferred to include an expansion loop or expansion undulation in the sealing foil in order to permit temperature expansion/contraction and/or longitudinal expansion/contraction. The sealing foil, thus, will form a sealing membrane or barrier wall, with a somewhat flexible contour, which can change in linear dimension, permitting use of the remaining material for the pillows to have essentially the requisite support function and to construct sealing pillows which have materials and cross sections designed especially to accept the respective support functions, with less attention to the sealing effect, which is taken over by the foil itself.

In accordance with a feature of the invention, and in a preferred structure, the pillow may include a heat insulating region, radially within the pillow itself. Thus, and without any extra or special material use, the sealing pillow itself is protected against over-temperatures, and any sealing membranes or sealing elements are protected against temperature deterioration; furthermore, the ring space or chamber is protected against excessive temperatures.

DRAWINGS

FIGS. 1 through 6 illustrate in half-longitudinal section end portions of two pipes or tubes, sealed together in accordance with the present invention.

DETAILED DESCRIPTION

Figure 1:
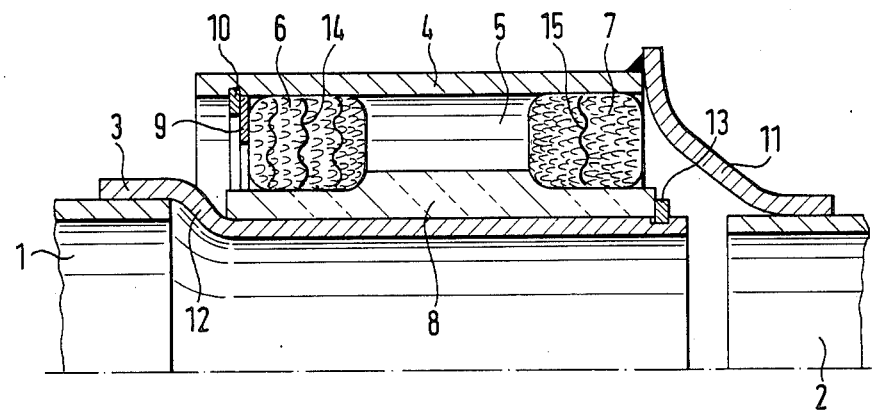

Two ends 3, 4 of pipes 1, 2 are positioned coaxially with respect to each other, and fitted, one over the other, as best seen in FIG. 1. The pipe ends are initially retained in suitable, essentially aligned position with respect to each other, although the alignment need not be precise and can be in accordance with a desired placement. The ends of the pipes 3, 4 are so dimensioned that they define, between each other, a ring space or chamber 5. The chamber 5 retains therein at least one, and as shown, preferably two—possibly more—sealing pillows 6, 7. The sealing pillows in the embodiment of FIG. 1 are of essentially rectangular cross section, formed as closed rings. The sealing pillows are seated on a heat-insulating sleeve 8, which is formed with depressions at the end to provide an axial seat for the sealing pillows. The pillows are seated on the sleeve 8, being retained thereon radially. As shown, the sealing pillows 6, 7 are thereby retained both in axial as well as in radial position, and are mutually supported with respect to each other and with respect to change in radial dimension as well as in axial dimension. The sealing pillow 6 is, additionally, axially retained by a support washer 9 which is held in place by a C snap ring 10 fitted in a suitable groove in the pipe end 4 of pipe 2. The axial support for the cushion or pillow 7 is formed by a reducing element 11 which is a ring structure 11 welded to the end portion 4 of the pipe 2, and also to the pipe 2 itself, although it could be formed as a single integral unit with the pipe 2, for example by an expansion end portion thereof. The sleeve 8 is axially retained in position at the left side—with respect to FIG. 1—by a shoulder 12 formed on the end portion 3 of pipe 1; as shown, the end portion 3 may be separate from the pipe 1 itself and welded, or otherwise attached thereto. Alternatively, it could be formed integrally with pipe 1. The right side of sleeve 8—with respect to FIG. 1—is retained in position by a C ring 13 fitted in a suitable external groove on the pipe end 3.

In operation, and when the pipes 1, 2 carry fluids, for example exhaust gases from an internal combustion engine, or other hot and potentially corrosive fluids, the sealing pillows 6, 7 provide for axial, lateral and angular support of the pipes with respect to each other, or, rather, specifically of the pipe ends 3, 4 with respect to each other.

The pillows 6, 7 may be made of a metal filamentary material, for example of metal fibers knitted or otherwise interconnected with each other, extending over the entire radial cross section. The metal fibers, filaments or wires, connected by weaving, knitting, braiding or similar operation, are compressed. Sealing foils 14, 15 are located within the metal pillows, as shown, and inserted therein before compression, so as to be compressed together with the metal mesh or fabric. As can be seen, the sealing foils are corrugated, creased or wrinkled, and extend radially, but not necessarily geometrically. Relative movement in axial, torsional or lateral direction of the pipes 1, 2 will not interfere with sealing of fluids within the pipes 1, 2 and the end portions thereof, and the outside, or ambient space external of the pipes 1, 2 and the end portions 3, 4.

As can be seen, the construction is radially small and axially short. For some uses, it may be sufficient if a single sealing pillow or cushion is used, so that two cushions 6, 7 can be replaced by a single cushion which, axially, is somewhat longer than the cushions 6, 7 illustrated. Of course, other arrangements than the ones shown can be used to retain the the pillows and the insulating sleeve 8 in position. For example, the C rings 10, 13 can be replaced by rolled-over edges of the respective elements 4, 3. If that is done, however, replacement of the pillows, and disassembly of the pipes from each other, is inadvisable, since the junction is practically permanent and cannot be readily severed without cutting of the rolled-over end of the left side portion of the pipe end 4 (with respect to FIG. 1). For replacement, and severing of the pipe ends, it is thus preferred to use releasable C clamps and the like.

Figure 2:
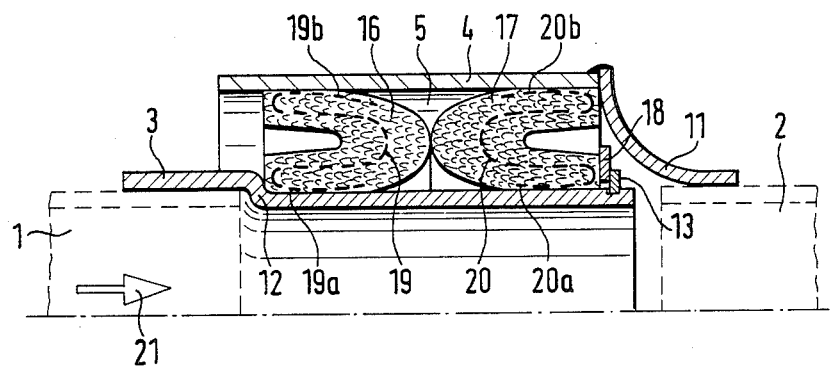

Embodiment of FIG. 2: The pipes 1, 2 and the pipe ends 3, 4 are similar to the construction shown in FIG. 1. The difference is in the form of the sealing pillows or cushions 16, 17 which are fitted into the chamber or ring space 5. The cushions 16, 17 have essentially V-shaped cross-section, placed horizontally. The free legs of the V are so arranged that the apeces of the V are close to each other, so that they can engage and support each other, whereas the legs of the V face opposite each other—see FIG. 2. The sealing cushion 16 is fitted against the shoulder 12 in the end 3 of the pipe 1; the sealing cushion 17 is axially retained against a portion of the reducer 11. Additionally, a washer 18 is provided, retained by the C ring 13 to provide for support of the radially inner leg of the right V cushion 17.

A corrugated, creased or wrinkled metal foil 19, forming a sealing foil, is formed and retained in the sealing pillow 16; a similar creased, corrugated or wrinkled metal foil 20 is located in pillow 17. The foils 19, 20 are made of special steel. The foils extend over the entire radial cross-section of the ring space or chamber 5, being formed at their ends by bent-over end portions 19a, 19b and 20a, 20b, respectively. The bent-over or looped-back foil ends 19a, 19b, 20a, 20b are carried to the outer surface of the sealing cushions 16, 17 respectively.

The foils 14, 15 (FIG. 1) and 19, 20 (FIG. 2) are illustrative. Such foils can be used not only in the embodiment described, but in all embodiments—see below—as well. Likewise, rather than folding over foil ends 19a, 19b, for example, it is equally possible to provide jackets around the outer circumference of the sealing foils, sleeves around the inner circumference of the sealing foils, bandage-like wrappings about the inner or outer circumferences, or complete wrapping about all outer surfaces of the sealing cushions besides, of course, introducing sealing foils into the interior of the cushions in a desired placement. Preferably, the sealing cushions have a surface area which greatly exceeds the plan area of the foils themselves, that is, have creased, corrugated or wrinkled surfaces to permit expansion and contraction with the cushion to which they are attached, or within which they are retained.

FIG. 2 additionally illustrates a preferred form of the placement of the seal and the pipe connection. The connections should be so placed that the direction of flow of the fluid medium is in accordance with the arrow 21, although this is not strictly necessary.

Figure 3:
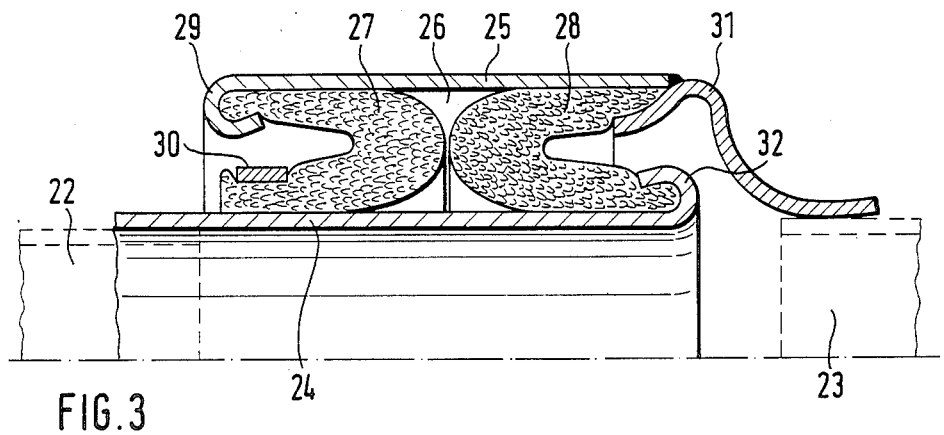

Embodiment of FIG. 3: The end portions 24, 25 of pipes 22, 23 are, in general, similar in effect and arrangement to the portions 3, 4 of FIG. 1. Sealing pillows or cushions 27, 28 are used which, in general, can be similar to the cushions 16, 17 of FIG. 2. The difference between the embodiments is the final attachment of the sealing cushions. As best seen in FIG. 3, the free ends of the legs of the sealing cushions are pinched or compressed. Thus, the pipe end 25 is rolled over, as seen at 29, to hold cushion 27 in position. Axial slots cut into the end 29, at various circumferential locations, which facilitates bending over of the ends 29. The radially inner leg of the sealing element 27 is compressed against the pipe end 24 by a clamping ring 30. The cushion 28 is pinched or compressed between the end portion of the reducer 31, secured to pipe 23 and a rolled-over end 32 of the pipe end 24.

Fitting the free ends of the sealing cushions 27, 28 in the manner shown, that is, by compressing the ends of the legs of the sealing cushions by the pipe ends themselves, results in particularly good sealing which, further, can be enhanced by use of foils as described in connection with FIG. 2. Additionally, the pipe ends 24, 25 are supported with respect to each other regarding torsion via the sealing cushions 27, 28. Some freedom of movement is provided and damping can be determined by the construction of the cushions 27, 28 themselves. In contrast, torsional or twisting movement is basically possible without restriction in the embodiments of FIGS. 1 and 2. The control of torsional movement and damping of torsional vibrations in the embodiment of FIGS. 1 and 2 can be obtained by controlling the tightness or engagement of the seat of the respective sealing cushion or pillow on or against the ends of the pipes. The degree of compression effected by the bent-over ends 29, 32 and the clamping effect of the rings 30 and the reducer 31 likewise will control the extent of permissible torsion or vibration.

Figure 4:
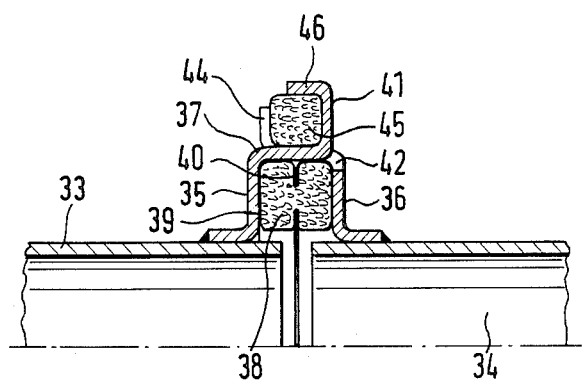

Embodiment of FIG. 4: The pipe ends 33, 34 have radial flanges 35, 36 welded thereon, in which the flanges have extending portions. Flange 35 is formed with an axially extending portion 37 extending over the end of the pipe 34 and thereby defining the annular chamber or ring-shaped space. Depending on the location of the flange 36, this ring-shaped chamber or space can readily be shifted towards the right—with respect to FIG. 4—by merely placing the flange 36 further to the right and/or extending the axial dimension of the overlapping portion 37 farther towards the right.

A single sealing cushion 38 is located within the ring chamber which, in the embodiment shown, is surrounded by a foil jacket 39 in order to provide for appropriate sealing. The foil jacket 39 is formed with two radially inwardly directed expansion/contraction loops or regions 40 in order to prevent possible tearing of the foil under differential expansion or contraction and movement of the sealing cushion 38.

As best seen in FIG. 4, the free end of the overlapping portion 37 is formed with a radially outwardly directed support surface 41. The flange 36 is formed with axially extending projection end portions 42 formed with openings through which the support ends 41, projecting from the overlapping part 37, can extend. The extensions 42, coupled to the flange 36, are radially projecting as best seen in 44, to form counter support surfaces. A second support or sealing cushion 45, having damped springy characteristics, is located in the space formed between the interengaging, interlaced radially projecting surfaces 41, 44. Pillow or cushion 45 is formed as a continuous ring; in a different embodiment, it may be formed of a plurality of symmetrically located individual ring portions, distributed over the circumference of the sealing surface. The support surface 41 is preferably extended axially towards the pipe end 33 to provide for additional radial support and protection for the second cushion 45, as best seen in FIG. 4. Similar axial extensions directed towards the right (with respect to FIG. 4) can, of course, also be provided on the radial extensions 44 of the flanges 36 to retain the ring 45 essentially entirely circumferentially protected and in position.

As best seen in FIG. 4, the axial extent of the seal can be reduced to a minimum; the stress placed on the cushion or pillow 38 is reduced to some extent, and accepted by the second cushion 45, which provides back-up support.

Figure 5:
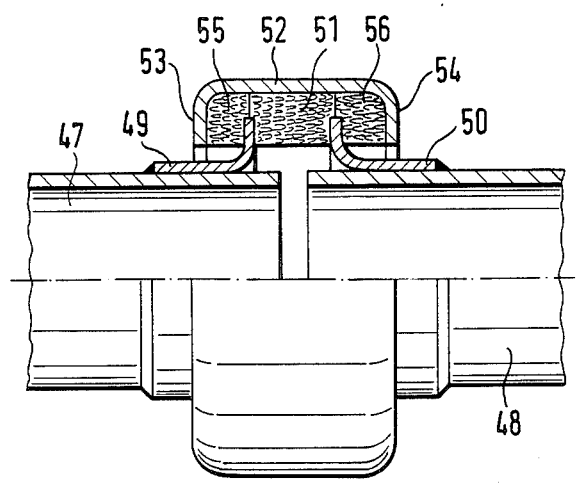

Embodiment of FIG. 5: The sealing space or chamber within which the sealing cushions or pillows are located can also be placed in the axial position over the junction or joint of the ends of the pipes 47, 48. The pipe ends 47, 48 are formed with radially extended flanges 49, 50, for example, as separate elements welded to the pipes 47, 48 (see FIG. 5). The sealing cushion or pillow 51 is radially inwardly supported by the free edges of the flanges 49, 50. Radially outer support for the pillow 51 which, for example, is a ring element, is provided by an outer sleeve 52 which is formed at the ends with inwardly rolled-over ring portions 53, 54. The sealing ring pillow 51 is axially additionally supported over support pillows or rings 55, 56 which fit the free ends of the flanges 49, 50, and thus also provide for axial compression and positioning of the pipes 47, 48 with respect to each other. The rings 55, 56 likewise axially place the sealing pillow ring 51 and provide for compressive force thereagainst. The sleeve 52 can be a single element, permanently forming part of the pipe connection, or can be a removable part, for example axially slit at a suitable location, with a clamping screw or equivalent arrangement bridging the slit to hold the sleeve together in the form of a clamping ring.

Figure 6:
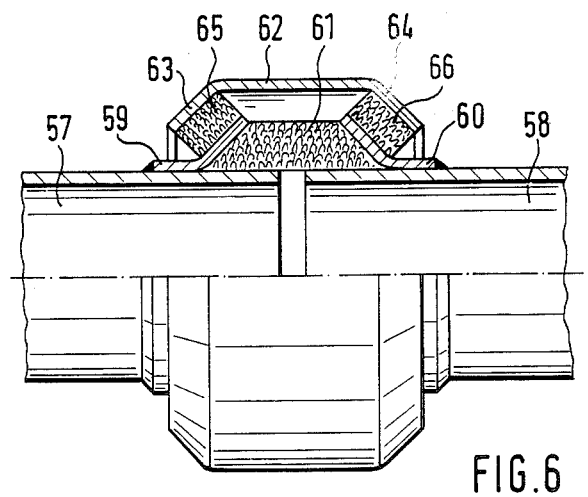

Embodiment of FIG. 6: Basically, the construction of FIG. 6 corresponds to that of FIG. 5, in that the sealing pillow is a ring element which bridges the ends of the pipes 57, 58. The ends 57, 58 are formed with radially extending flanges 59, 60, the sealing ring 61 being fitted between the radially positioned flanges. Preferably, the flanges do not extend vertically with respect to the pipe, but are angled, as best seen in FIG. 6. A sleeve or ring 62, formed with radially inwardly directed portions 63, 64, surrounds the seal and defines the chamber; support cushions 65, 66 are retained in position between the ring 62 and the flanges 59, 60 and/or the sealing ring 61, respectively.

The difference with respect to FIG. 5 is the inclined position of the flanges 59, 60, which are angled towards each other, for example by an angle of about 45°—which, however, is not critical. The lateral surfaces of the sealing cushions or pillows or rings 61 are also inclined, made to match the surfaces of the flanges. The sealing ring 61 is thus radially outwardly supported by the flanges 59, 60; the inner radial support of the cushion 61 is provided by the ends of the pipes 57, 58 themselves.

The distribution of sealing and support is basically similar in the examples of FIGS. 4, 5 and 6, in that one element forms a sealing cushion or pillow, and another element essentially only a support cushion or pillow, having the necessary or desired damping and support and material strength characteristics. In accordance with FIGS. 5 and 6, the support pillows can be formed as continuous circumferential rings if they have to have the function, simultaneously, of sealing and support; in that arrangement, then, a serially connected double-seal effect is obtained, once by the central sealing-and-support ring 61 and, laterally thereof, by the additional sealing-and-support rings 55, 56 (FIG. 5) or 65, 66 (FIG. 6).

The present invention, thus, provides a sealed connection between pipes in which a ring chamber or space 5, 26 is provided by so forming the pipes that one pipe end overlaps the other. The ring space, thus, is radially positioned between the ends of the pipes, and the sealing pillow or cushion is located therein.

The ring space may also be formed—see FIGS. 5, 6—by a coaxial sleeve or cuff, fitting about the ends of the pipes which are in butt alignment. The sleeve or cuff is formed with radially inwardly directed projections which are positioned to retain, directly or indirectly, the sealing pillow or cushion therein, the inwardly directed flange end portions of the sleeve or cuff overlapping outwardly directed flange portions formed on the pipe ends. The pillow is axially and, if desired, also radially supported between the flange ends formed on the pipes. The ring space, in this embodiment, is located essentially in axial direction between the ends of the pipes and as defined towards the outside by the sleeve or cuff, or similar structure. The sleeve or cuff also holds the ends of the pipes together and the sealing pillow or cushion in place.

In general, it is desirable to place at least two sealing pillows axially staggered. The sealing pillows may, for example, have an essentially rectangular cross-section—see FIGS. 1, 4, 5; they may, however, have a different cross-section, for example similar to a horizontally placed V—see FIGS. 2, 3, so positioned that the legs of the V are placed adjacent the ends of the pipes. Two such sealing pillows can be placed next to each other with, preferably, the legs of the V facing in opposite directions. Other suitable cross-sections for the sealing pillows may be used, for example circular, U-shaped with the base of the U extending radially or the like, similar to the illustration of FIGS. 2 and 3. The particular construction of the sealing pillow and the cross-sectional shape thereof must be matched to the design and construction of the ring chamber.

The axial support between the ends of the pipes and the sealing pillow can be obtained by change in cross-sectional dimension of the pipes, for example by suitably formed offsets of the pipe ends—see FIGS. 1 and 2. Other arrangements may be used, for example washers, holding projections or the like, and inserts such as resilient C rings, snapped in suitable grooves, in accordance with well known holding arrangements for axially positioning any constructional element.

In accordance with a suitable embodiment, the free ends of the pipes can be formed to retain free end portions of the pillows—see, for example, FIG. 3. The free ends are rolled over to clamp free end portions of the sealing pillows, or, alternatively, a clamping ring can be placed against the sealing pillow to clamp a respective V or U leg against an adjacent wall of the pipe. The clamping ring can be placed to provide for inward compression—see FIG. 3—or may be placed for outward compression, for example by an outwardly directed expansion ring. Clamping the sealing pillows, particularly when formed with ring-shaped lips, additionally increases the sealing effect, which is highly desirable upon occurrence of high temperatures. At high temperatures, creep of the medium can be expected. Further, a defined torsional support is provided for the ends of the pipes by clamping the sealing pillow in position.

In some constructions, the ends of the pipes may have radially directed flanges formed thereon, between which the sealing pillow can be supported, for example radially inwardly against at least one of the flanges. In such a construction, an outer support can be formed—see FIG. 4—so that the free end of the pillow is axially supported by the flanges and, further, by the radial extensions, in a radial direction. The flanges are formed with radial projections which interengage or interleaf, for example by having projecting portions from the flange of one pipe pass through openings in the flanges of the other, as described in detail in connection with FIG. 4. The pipes are maintained in position by the support and sealing pillow which will have damped resilient characteristics. The pipe ends are completely hooked together, and sealingly resiliently coupled by the support and sealing pillow. The support and sealing pillow is retained by an end portion, radially in position, which provides for acceptance of substantial radial forces by the sealing pillows, which are transferred to the respective axially extending portions of the flanges, so that substantial radial forces can be accepted by the structure as a whole.

The sealing pillow described in connection with FIG. 4, for example, can be used to transfer substantial radial forces by providing damped—resilient force transfer to the flanges. This construction can be used with other embodiments as well—see for example FIG. 6. The support pillow of damped—resiliently compressible structure can be formed as a continuous circumferential ring or in the form of circumferentially uniformly distributed support elements which are retained in position radially outwardly by projections or extensions of support surfaces or counter surfaces secured to the pipes or surrounding the pipes in form of a cuff, sleeve, or continuous or separable strap or band.

Sealing pillows and separate support pillows are shown particularly in FIGS. 4 and 6. The flanges need not be radially straight, but can be inclined, see FIG. 6, and in this embodiment an outer retaining sleeve is preferred which has surfaces parallel to the surfaces of the inclined flanges, with radially inwardly directed edges. The surfaces of the support pillow, then, will be parallel, and, of course, will be matched to the adjacent surfaces of the flanges and the inward extensions or rims of the surrounding sleeve or cuff or band. This construction permits transfer of radial as well as axial forces to the surrounding sleeve or band. The sealing pillow then will have an essentially trapezoidal cross-section. The sealing pillow is radially supported, for example directly on the outer walls of the pipes to be joined, and on the inner surface of the surrounding cuff, clamp or sleeve or band.

Various changes and modifications may be made, and features described in connection with any one of the embodiments may be used with any of the others, within the scope of the inventive concept.

We claim:

1. A connection arrangement to connect two pipes (3, 4; 24, 25), particularly for conveying hot fluids, especially exhaust gases from an internal combustion engine.
   in which one of the pipes has an end portion facing the end portion of the other pipe, said connection arrangement permitting relative movement of the two pipes with respect to each other in axial, lateral and angular direction, while maintaining a sealed connection preventing escape of fluid to ambient space,
   comprising
   means for defining a ring chamber or space (5, 26) surrounding the end portions of the pipes (3, 4; 24, 25);
   at least one sealing pillow (6, 7; 16, 17; 27, 28) located in said ring chamber or space,
   the material of said sealing pillow having damped springy characteristics,
   said at least one resilient springy sealing pillow being retained in said chamber or space in a predetermined axial and radial position;
   the facing ends of the pipes being radially supported and located in position in at least approximate alignment with respect to each other by said at least one resilient or springy sealing pillow retained in said ring chamber (5, 26), and
   a sealing foil (14, 15; 19, 20) embedded within the material of the pillow and extending over the entire radial region of said space or chamber (5).

2. The arrangement of claim 1, wherein said means for defining the ring chamber comprises an end region (4, 25) of one of the pipes coaxially with respect to a second end region (3, 24) of the other of the pipes, in which said first end region (4, 25) is of greater diameter than said second end region, positioned coaxially with respect thereto and said first and second end regions are overlapping.

3. The arrangement of claim 1, wherein at least two sealing pillows (6, 7; 16, 17; 27, 28) are located axially adjacent each other.

4. The arrangement of claim 1, wherein the at least one sealing pillow comprises a ring element of essentially rectangular cross-section.

5. The arrangement of claim 1, wherein said means for defining the ring chamber comprises an end region (4, 25) of one of the pipes coaxially with respect to a second end region (3, 24) of the other of the pipes, in which said first end region (4, 25) is of greater diameter than said second end region, positioned coaxially with respect thereto and said first and second end regions are overlapping;
   and wherein the at least one sealing pillow (16, 17; 27, 28) comprises an element of, in cross-section, essentially V shape, the legs of the V being in engagement with the end portions (3, 4; 24, 25) of the pipes.

6. The arrangement of claim 5, wherein two sealing pillows (16, 17; 27, 28) are provided, positioned in said ring chamber or space with the apeces of the V-shaped elements being positioned adjacent each other.

7. The arrangement of claim 5, including means for retaining said V-shaped sealing pillow in axial position comprising rolled-over edge portions (29, 32) of the pipe ends, engaging and clamping an adjacent terminal portion of the leg of the V of the sealing pillow.

8. The arrangement of claim 5, including means sealingly clamping a leg of the V against a pipe and comprising a clamping ring located inwardly of the V and clamping the V leg of the sealing pillow against an adjacent wall of the pipe being sealed by the respective pillow.

9. The arrangement of claim 5, wherein the sealing foil is bent in V-shape and essentially sealingly embedded in said at least one sealing pillow of essentially V-shaped cross-section; and the sealing foil is formed, at end regions of the leg portions of the V, with bent-over portions (19a, 20a; 19b, 20b) which are looped back in a direction facing the apex of the V.

10. The arrangement of claim 1, including means for axially positioning said at least one sealing pillow, said means comprising a deformation (11, 12) resulting in change of diameter of the pipe ends.

11. The arrangement of claim 1, wherein said means for defining the ring chamber comprises an end region (4, 25) of one of the pipes coaxially with respect to a second end region (3, 24) of the other of the pipes, in which said first end region (4, 25) is of greater diameter than said second end region, positioned coaxially with respect thereto and said first and second end regions are overlapping;

and further including means axially positioning the at least one sealing pillow comprising axially extending projection means and means (10, 13) retaining said projection means in position at predetermined axial locations on the ends of the pipes.

12. The arrangement of claim 1, wherein the at least one sealing pillow comprises a high-temperature and corrosion-resistant material of at least one; ceramic; metal, said material being in form of a compressed structure of at least one of: fiber wire, filamentary wire, felt, fabric, woven material, knit, material.

13. The arrangement of claim 1, wherein at least one of said pillows includes low-friction, high-slip material at least at an outer surface thereof.

14. The arrangement of claim 1, further comprising at least one of;

low-friction or slippery material;

sealing material compressed together with the material of the pillow.

15. The arrangement of claim 1, further comprising a material having at least one of:

enhanced hardness enhanced material strength inserted within the sealing pillow and compressed therein.

16. The arrangement of claim 1, further including a sealing foil surrounding the outside of the sealing pillow.

17. The arrangement of claim 1, wherein the sealing foil comprises corrugated, creased or wrinkled metal associated with the structure of the sealing pillow.

18. The arrangement of claim 17, wherein the metal foil comprises at least one of: specialty steel; aluminum.

19. The arrangement of claim 1, further including a heat insulating element (8) located adjacent the sealing pillow and radially inwardly thereof.

* * * * *